(12) United States Patent
Krauss

(10) Patent No.: US 8,806,445 B2
(45) Date of Patent: *Aug. 12, 2014

(54) THREAD SERIALIZATION AND DISABLEMENT TOOL

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 13/429,981

(22) Filed: Mar. 26, 2012

(65) Prior Publication Data

US 2012/0254840 A1 Oct. 4, 2012

Related U.S. Application Data

(63) Continuation of application No. 12/623,741, filed on Nov. 23, 2009.

(51) Int. Cl.
*G06F 9/44* (2006.01)
*G06F 15/173* (2006.01)
*G06F 11/00* (2006.01)

(52) U.S. Cl.
USPC ........... 717/127; 717/128; 717/131; 709/223; 709/224; 709/225; 714/37; 714/39

(58) Field of Classification Search
None
See application file for complete search history.

(56) References Cited

U.S. PATENT DOCUMENTS

| | | | |
|---|---|---|---|
| 5,675,798 A * | 10/1997 | Chang | 709/224 |
| 6,434,590 B1 | 8/2002 | Blelloch et al. | |
| 7,082,601 B2 | 7/2006 | Ohsawa et al. | |
| 7,150,002 B1 | 12/2006 | Anderson et al. | |
| 7,225,446 B2 | 5/2007 | Whitton | |
| 7,320,065 B2 | 1/2008 | Gosior et al. | |
| 7,516,446 B2 | 4/2009 | Choi et al. | |
| 7,765,547 B2 * | 7/2010 | Cismas et al. | 718/100 |
| 7,958,234 B2 | 6/2011 | Thomas et al. | |
| 8,127,010 B2 | 2/2012 | Sinha | |
| 8,332,858 B2 | 12/2012 | Krauss | |
| 8,392,932 B2 | 3/2013 | Kawamoto | |
| 8,549,523 B2 | 10/2013 | Krauss | |
| 8,667,472 B1 * | 3/2014 | Molinari | 717/130 |
| 2003/0018684 A1 * | 1/2003 | Ohsawa et al. | 709/102 |
| 2005/0044205 A1 * | 2/2005 | Sankaranarayan et al. | 709/223 |
| 2007/0271381 A1 | 11/2007 | Wholey et al. | |
| 2008/0134180 A1 | 6/2008 | Floyd | |
| 2011/0126174 A1 | 5/2011 | Krauss | |
| 2011/0126202 A1 | 5/2011 | Krauss | |
| 2012/0254840 A1 | 10/2012 | Krauss | |
| 2012/0254880 A1 | 10/2012 | Krauss | |

OTHER PUBLICATIONS

U.S. Appl. No. 12/623,778, Non-Final Office Action Jun. 17, 2012, 17 pgs.

(Continued)

*Primary Examiner* — Michael Sun

(74) *Attorney, Agent, or Firm* — Cuenot, Forsythe & Kim, LLC

(57) ABSTRACT

A computer-implemented method of performing runtime analysis on and control of a multithreaded computer program. One embodiment of the present invention can include identifying threads of a computer program to be analyzed. With a supervisor thread, execution of the identified threads can be controlled and execution of the identified threads can be monitored to determine a status of the identified threads. An indicator corresponding to the determined status of the threads can be output.

9 Claims, 11 Drawing Sheets

(56) References Cited

OTHER PUBLICATIONS

U.S. Appl. No. 12/623,778, Final Office Action, Nov. 9, 2012, 15 pgs.

Utrera et al., "Implementing Malleabililty of MPI Jobs," IEEE PACT '04, pp. 1-10, 2004.

Maghraoui et al., "Dynamic malleability in Iterative MPI Applications," Concurrency and Computation Practice and Experince, 2008, pp. 1-22.

Wikipedia, "nice (Unix)", http://en.wikipedia.org/wiki/Nice_%28Unix%29>>, (last visited on Nov. 17, 2009).

Microsoft, "Analyzing Processor Activity," <<http://www.microsoft.com/technet/prodtechnol/windows2000serv/reskit/prork/pred_ana_umwv.mspx?mfr=true>>, (last visited on Nov. 17, 2009).

U.S. Appl. No. 12/623,741, Non-Final Office Action, Apr. 11, 2013, 23 pg.

U.S. Appl. No. 13/428,408, Non-Final Office Action, May 23, 2013, 17 pg.

U.S. Appl. No. 13/623,778, Notice of Allowance, May 28, 2013, 12 pg.

U.S. Appl. No. 12/623,778, Final Office Action, Sep. 12, 2013, 27 pg.

U.S. Appl. No. 13/428,408, Notice of Allowance, Oct. 1, 2013, 11 pg.

* cited by examiner

THREAD SERIALIZATION AND DISABLEMENT TOOL

CROSS-REFERENCE TO RELATED APPLICATIONS

This application is a Continuation of U.S. application Ser. No. 12/623,741, filed on Nov. 23, 2009, the entirety of which is incorporated herein by reference.

FIELD OF THE INVENTION

The embodiments of the present invention relate to real time analysis and control of a threading model of a running application program.

BACKGROUND OF THE INVENTION

As the proliferation of computers in modern society continues to grow, so too do the tasks that we delegate to them. Moreover, the complexity and size of computer programs required to perform such tasks also increases, as does the level of computer processing power required to properly execute these programs. Historically, the primary means implemented for increasing computer processing power has been to increase processor clock speed. In recent years, however, the ability to continually increase clock speeds to gain more processing power has curtailed. Thus, other avenues to improve computer performance have been adapted. One such adaptation is the use of multi-core processors. A multi-core processor is a processor that comprises a plurality of processing cores, oftentimes manufactured on a single silicon wafer.

In order to fully exploit the advantages of a multi-core processor, a computer program must be multithreaded. In contrast to traditional computer programs, which were primarily designed for serial execution using a single processing core, a multithreaded computer program comprises multiple threads of execution, generally referred to as "threads", that may be executed in parallel using a plurality of processor cores. For example, one thread can be dynamically assigned to a first processor core, another thread can be dynamically assigned to a second processor core, and so on. Accordingly, the execution power of multiple processor cores can be combined to increase the speed at which application processes are executed.

The adaptation of multithreading in computer program design has not kept pace with the adaptation of multi-core processors. Indeed, many currently available computer programs are designed to effectively use at most one or two processor cores, while four-core (i.e. quad core) processors now are widely available. The complexities involved in designing dynamic multithreading architectures that effectively use more than one or two processor cores has shown to be a primary hindrance to the adaptation of such architectures. For example, when problems induced by race conditions such as heap corruption or confused program states occur in a multithreaded computer program, it can be very difficult and cumbersome to identify which thread or threads are responsible.

BRIEF SUMMARY OF THE INVENTION

The embodiments disclosed herein relate to a computer-implemented method of performing runtime analysis on a multithreaded computer program. One embodiment of the present invention can include identifying threads of a computer program to be analyzed. With a supervisor thread, execution of the identified threads can be controlled and execution of the identified threads can be monitored to determine moment-by-moment status of the identified threads. An indicator corresponding to the determined status of the threads can be output.

DETAILED DESCRIPTION OF THE INVENTION

Figure 1:
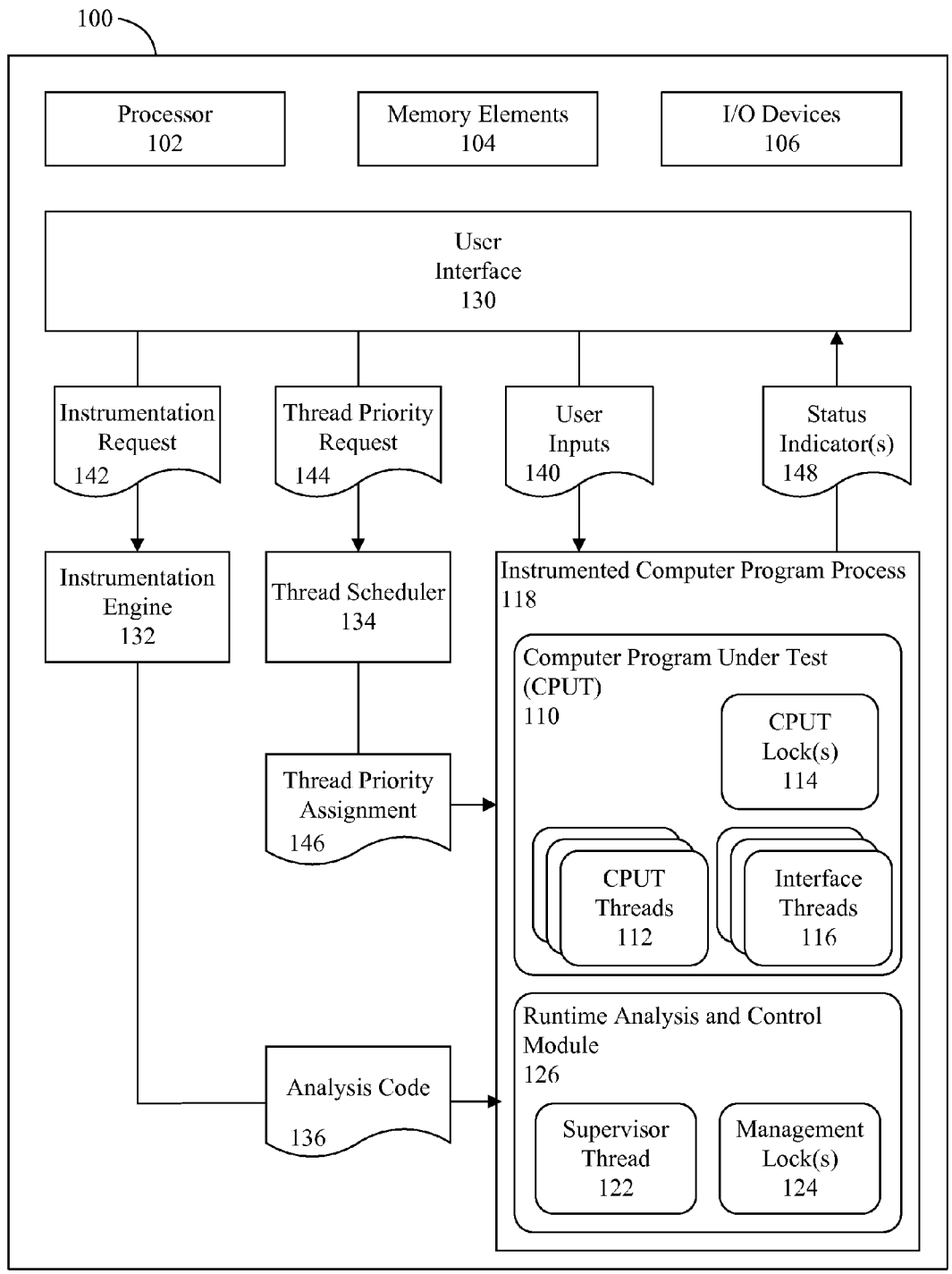
FIG. 1 is a block diagram illustrating a system for controlling execution of computer program threads in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, electromagnetic, magneto-optical, infrared, or semiconductor system, apparatus, device, or propagation medium. More specific examples (a non-exhaustive list) of the computer-readable medium(s) would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or block diagram block or blocks.

The embodiments disclosed herein relate to controlling and monitoring execution of threads in a multithreaded computer program in order to identify and diagnose undesirable behavior of the threads. More particularly, as a multithreaded computer program under test (hereinafter "CPUT") executes, execution of the threads of the CPUT can be controlled to change the behavior of the CPUT in useful ways. For example, via the user interface, a user can enable or disable (e.g., pause) threads, set thread priorities, and so on. Via the user interface, a user also can select a thread, or a group of threads, and serialize their execution. As used herein, threads that are serialized, or more simply "serialized threads," are threads that, during runtime analysis, are configured to execute sequentially for purposes of the analyses described herein.

In addition, information pertaining to the status of the Threads can be monitored, collected, and presented to a user via a user interface. The status information can indicate threads that are enabled, threads that are disabled, thread priority levels, invocation of various functions, recorded events, and so on. The status information also can indicate the use of locks by the threads. The status information that is collected can be recorded in one or more tracking structures and displayed. For example, tracking structures can be presented that track the current status of various threads, the use of CPUT locks, the use of management locks, recorded events, use of common resources, and so on.

Notably, the execution information that is collected can indicate those instances in which threads are performing properly, and when execution problems occur. For instance, race conditions can be identified. A race condition is a situation in which the output and/or result of an instruction or operation executed by a thread is critically dependent on the sequence or timing of other events that may occur in the course of execution of other threads. Certain race conditions can be eliminated via the present invention using one or more management techniques disclosed herein to control the execution of Threads 112. Any race condition that is demonstrably eliminated during simulation using these management techniques can be identified. A computer programmer then can eliminate the race condition programmatically, for example by rewriting or revising a portion of the CPUT's code.

FIG. 1 is a block diagram illustrating a data processing system (hereinafter "system") 100 in accordance with one embodiment of the present invention. The system 100 can be suitable for storing and/or executing program code and can include at least one processor 102 coupled directly or indirectly to memory elements 104 through a system bus (not shown). The memory elements 104 can include local memory employed during actual execution of the program code. The memory elements 104 also can include bulk storage and cache memories. Accordingly, the memory elements 104 can include system memory in which an operating system and various analysis tools can be stored. The processor 102 can execute the analysis tools, in cooperation with the operating system, to perform the various processing functions described herein. Examples of the analysis tools may include a runtime analysis module 126, a user interface 130, an instrumentation engine 132, a thread scheduler 134, and the like. These analysis tools will be described herein.

The system also can include input/output (I/O) devices 106 such as, for example, keyboards, displays, pointing devices, microphones, speakers, disk storage devices, tape storage devices, other memory devices, etc., which can be coupled to the system 100 either directly or through intervening I/O controllers (not shown). Network adapter(s) (not shown) also may be provided in the system 100 to enable the system 100 to become coupled to other systems or remote printers or storage devices through intervening private or public networks. Modems, cable modems, and Ethernet cards are just a few of the currently available types of network adapters.

The system 100 can be configured to perform runtime analysis on a CPUT 110. The CPUT 110 can comprise a plurality of CPUT threads (hereinafter referred to as "threads") 112 whose access to computer resources is mediated by CPUT locks 114. A thread 112 is an object of execution within a computer program and may be executed concurrently with the program's other threads. A thread can include an instruction pointer and a thread-specific stack. The instruction pointer can indicate which program instruction is currently being executed by the thread. In other words, the instruction pointer can indicate where a thread is in its instruction sequence. The thread's stack is a dynamic data structure that stores information about the active subroutines of the computer program. For example, the stack can store a return address that indicates a location where a subroutine is to return after being executed. A thread's stack also can serve additional purposes. For instance, a stack can serve as a memory space for local variables, can serve to pass parameters between subroutines executed by the thread, and so on. The conventional operation of threads, instruction pointers and stacks is well known to those skilled in the art. Notwithstanding, the present invention introduces additional thread operations that are not known in the prior art, as will be described.

One or more CPUT locks 114 can be implemented as objects or other suitable data types which are implemented to prevent simultaneous use of a common resource (e.g., a global variable or re-entrant code) by multiple threads 112. More than one thread can have a handle to the same CPUT lock 114, making inter-process synchronization possible. Another term oftentimes used for "lock" is "synchronization object." Accordingly, a synchronization object which performs the functionality of a lock as described herein will be understood by those skilled in the art to be a lock.

One common example of a CPUT lock 114 is a mutex object. A mutex object is a type of synchronization object whose handle can be specified by at least one wait function to coordinate the execution of multiple threads 112. A mutex object only allows exclusive access to a common resource by a single thread 112 at any given time. For instance, a mutex object may be used to serialize access to a common resource. If a first thread currently holds the mutex object, other threads must wait until that thread has released the mutex object before accessing the common resource. After the first thread releases the mutex object, a second thread then can acquire the mutex object, and thus access the common resource.

Another example of a CPUT lock 114 is a semaphore. A semaphore is another type of synchronization object. In contrast to a mutex object, a semaphore can allow a certain number of threads 112 (e.g., one or more threads 112) to access a common resource at a time. For example, a semaphore can maintain a count between zero and some maximum value, limiting the number of threads that may share ownership of the semaphore and thereby simultaneously access a common resource. The count can be decremented each time a thread obtains shared ownership of the semaphore, and can be incremented each time a thread releases the semaphore. The state of a semaphore can be set to be signaled when its count is greater than zero, and non-signaled when its count is zero. While the count is zero, no more threads can obtain ownership of the semaphore until its state becomes signaled. Of course, other means of tracking the use of a semaphore can be implemented. For instance, the counting operation can be reversed, and threads may only obtain ownership of a semaphore when the count is less than a certain value. Still, a myriad of other techniques can be implemented for allocating ownership of semaphores, and the invention is not limited in this regard.

To perform runtime analysis on a program, the program to be analyzed can be instrumented via a procedure that inserts additional instructions into the program to create the CPUT 110. This procedure may be referred to as "code instrumentation". When the CPUT 110 that has undergone code instrumentation is executed, the executing process can load one or more modules designated by the instrumentation procedure. The combination of the CPUT 110 and any such additional modules may be referred to as an "instrumented computer program process" 118. The instrumented computer program process 118 can include a runtime analysis module 126 that can include code executed by a supervisor thread 122 or by the CPUT's own threads 112.

The supervisor thread 122 can manage the threads 112 (e.g., control the execution of the threads 112) of the CPUT 110 using one or more management locks 124. These management locks 124 also can include one or more mutex objects and/or semaphores, and are in addition to any other CPUT locks 114 provided in the CPUT 110. In accordance with the inventive embodiments described herein, a management lock 124 may be controlled by a user for runtime analysis of the CPUT 110.

The supervisor thread 122 can be used to prioritize execution of the threads 112, track execution of the threads 112, track usage of the CPUT locks 114, and so on. For example, an application program interface (API) (not shown) can be provided to receive user inputs 140 and, based on these user inputs, assign and/or adjust priorities of the Threads 112, serialize Thread execution, etc. The supervisor thread also can receive user inputs for assigning management locks 124 to the Threads 112, as well as track the usage of the management locks 124.

The functions described herein that are performed by the supervisor thread 122 and the CPUT's threads 112 can be implemented in real time. As used herein, the term "real time" means a level of processing responsiveness that a user or system senses as sufficiently immediate for a particular process or determination to be made, or that enables the processor to keep up with some external process.

As noted, the system 100 further can include a user interface 130, an instrumentation engine 132 and a thread scheduler 134. The thread scheduler 134 may be supplied as part of the operating system on which the instrumented computer program process 118 is running, or it may be provided as part of the runtime analysis module. The user interface 130 can be implemented as a graphical user interface, as a text based user interface (e.g., a command prompt based interface), or as any other suitable user interface which receives user inputs. The user inputs may be inputted as menu/icon/button selections, alphanumeric entries, spoken utterances, or in any other suitable manner.

In response to receiving an instrumentation request 142 from a user via the user interface 130, the instrumentation engine 132 can perform code instrumentation and thereby insert analysis code 136 into the CPUT 110 as appropriate. The code instrumentation can be performed on the CPUT 110 in any suitable manner, for example using techniques known to the skilled artisan.

The thread scheduler 134 can receive a thread priority request 144 from a user via the user interface 130 and, in response, generate a corresponding thread priority assignment 146. The thread priority assignment 146 can specify the priority level that is assigned to one or more of the Threads 112. During execution of the instrumented computer program process 118, priority levels programatically assigned to various threads 112 of the CPUT 110 can be evaluated. Those threads 112 with the highest priority levels can be granted priority over other threads 112. For example, if a first thread 112 of the CPUT 110 has higher priority than a second thread 112, a management lock 124 can lock a particular common resource being used by the first thread 112 until the first thread's execution is completed.

Moreover, thread priorities can be analyzed and, based on these priorities, a decision can be made on how to schedule the threads. A higher priority thread will typically receive more processor resources than a lower priority thread. For example, as those skilled in the art will appreciate, the thread scheduler 134 can assign time slices more frequently to a thread of relatively high priority than to threads of relatively low priority. In accordance with the embodiments described herein, a thread can be assigned a higher priority than it would otherwise have. This assignment of priority can be implemented either by directly setting the priority of a thread 112 or by modifying how the CPUT 110 assigns thread priorities, which can happen at any time while the thread 112 runs.

In operation, the instrumented computer program process 118 can communicate status indicators 148 to the user interface 130 for presentation to the user. The status indicators 148 can identify various Threads 112 and corresponding status information. The status indicators 148 can indicate, for example, which threads 112 are waiting (i.e., prevented from executing) and which threads 112 are not waiting (i.e., available for execution). Other status indicators 148 can indicate threads 112 that are selected for serialization, threads that are holding CPUT locks 114 or management locks 124, threads that are waiting for CPUT locks 114 or management locks 124, thread priority levels, and so on.

The status indicators 148 can be presented in the user interface 130. For example, the status indicators 148 can be presented in one or more thread tracking lists or as data formatted in any other manner which enables the user to track the status of threads 112 of the CPUT 110, CPUT locks 114, management locks 124, recorded events and/or any other desired information.

When the CPUT 110 is instantiated, it will typically begin with one thread 112. As the thread executes, that thread can create and terminate other Threads 112. New Threads 112 can be created via API calls. These API calls can be intercepted by the runtime analysis module 126 in order to record identification information about the threads 112 (e.g., the call chain that led to a thread's creation, the start function that was specified for the thread, etc.) in a list or set of tracking structures associated with those threads 112. When a new thread 112 starts, the Thread can execute "thread attach logic" in every module loaded in the CPUT 110, as well as the runtime analysis module 126, before the thread 112 reaches a thread start function specified in the API call via which the thread 112 was launched.

When a thread 112 terminates, a thread termination API call from the CPUT 110 can be intercepted, or thread detach logic can be identified in the runtime analysis module 126. In one embodiment, both of these operations can be performed. A tracking structure associated with the terminated thread 112 then can be removed from a corresponding list or set of tracking structures, or can be updated to indicate that the thread has been terminated. These thread tracking procedures can be executed in the same process as the CPUT 110, for example using the Threads 112.

As noted, the user interface 130 can be used to receive user inputs 140, and to present status indictors 148 to the user. Accordingly, the user interface 130 facilitates a high level of user interaction for controlling the execution of threads 112 and monitoring their status. In one embodiment, the user interface 130 can be instantiated in a dedicated process. Accordingly, the CPUT 110 will not be hampered with user requests for navigating within the user interface, or the like.

In one embodiment, the runtime analysis module 126 can add one or more interface threads 116 to the CPUT 110. An interface thread 116 can be configured to process requests from the user interface 130. For example, the interface thread 116 can monitor a port, a pipe, or any other communication medium over which messages may be communicated between the runtime analysis module 126 and the user interface 130. When the interface thread 116 receives such messages, the interface thread 116 can process them accordingly. Examples of such messages include, but are not limited to, messages that change the priority of a thread 112, disable a thread 112, enable a thread 112, serialize a thread 112, and so on.

Thread priority changes are typically arranged via API function calls in which new thread priorities can be specified for the indicated threads. In one embodiment, the instrumentation engine 132 can arrange for such API function calls to be intercepted such that the runtime analysis module 126 can choose whether or not to execute the API functions. The choice of whether or not the thread priority change will occur can be user-directed.

For example, a "freeze thread priority" checkbox or button can be assigned to each Thread 112 that is represented in the user interface 130. If the user elects to freeze a given thread's priority, then the user interface component can signal an interface thread 116 or a supervisor thread 122 running in the CPUT process. A routine in the runtime analysis module 126 can be invoked by this thread in response to this signal from the user interface 130. This routine can look up a tracking structure corresponding to the user-specified Thread 112 whose priority is to be frozen and can set an indicator, such as a flag, in that tracking structure.

Any calls to API functions intended to change thread priorities also can be intercepted such that execution is diverted to an intercept routine in the runtime analysis module 126. That intercept routine can look up the tracking structure for the thread whose priority is to be changed via the intercepted API function. The intercept routine can check the indicator in that thread tracking structure to determine whether the user has elected to freeze the thread's priority. If so, then the API function call can be faked, such that it does not actually occur. Specifically, the intercept routine can return control to the CPUT routine that ostensibly invoked the API function, so that CPUT execution continues as though that API function had returned successfully.

An interface thread 116 also can be provided to monitor the status information associated with the Threads 112, and send this information to the user interface 130 for presentation in a user-viewable form. This interface thread 116 can be started when the runtime analysis module 126 is instantiated. The interface thread 116 can be terminated when the runtime analysis module 126 is unloaded from the system 100, or when the user elects to stop either the interface thread 116 alone or the runtime analysis and control procedures altogether. These user elections can be received as user inputs via the user interface 130.

Figure 2:
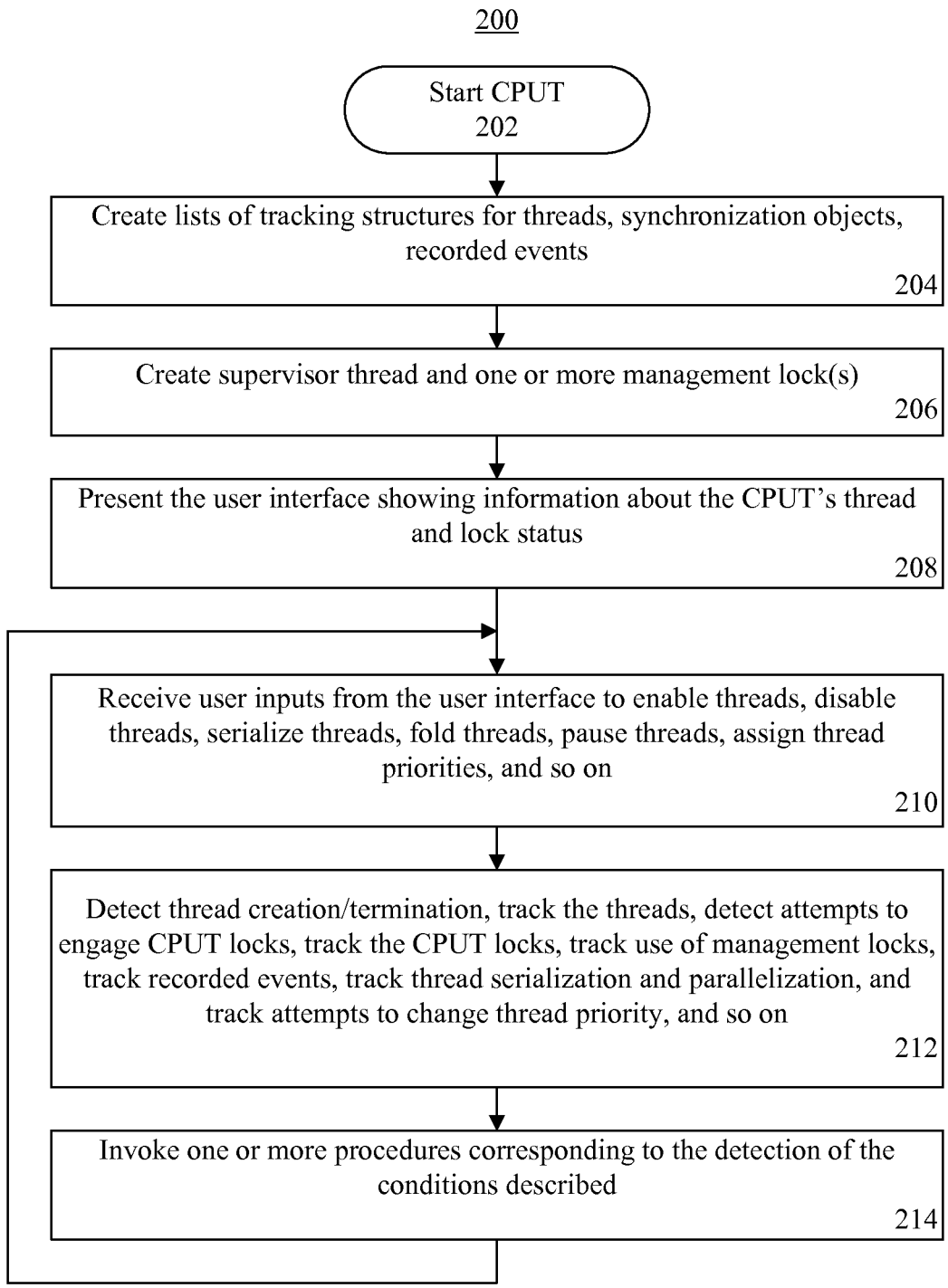
FIG. 2 is a flowchart illustrating a method of instrumenting a computer program under test (CPUT) and monitoring CPUT execution in accordance with another embodiment of the present invention.

FIG. 2 is a flowchart illustrating a method 200 monitoring execution of an instrumented CPUT 110 in accordance with another embodiment of the present invention. At step 202, the CPUT can be started. At step 204 various lists can be created for monitoring the execution of threads and performing runtime analysis of the threads. As noted, these lists can include any of a variety of tracking structures and tracking information. For example, the lists can indicate the status and runtime analysis configuration of threads (e.g., indicate whether the threads are serialized). The lists also can include tracking structures and/or other information that tracks the use of CPUT locks, the use of management locks, recorded events, use of common resources, and so on.

As used herein, a recorded event is an object that tracks an actual change of thread state or some other activity that occurs during the lifetime of a thread. For example, when a function is invoked by a thread 112, a recorded event tracking structure indicating the fact that a function was called by that thread 112 can be tracked in an event list, which can be specific to that thread 112. The thread's entry into a waiting state can also be tracked as a recorded event in the event list.

In one embodiment, the tracking structure for a particular thread can be created during the course of execution of thread attach logic by the thread. The thread tracking structure can be stored in a tree data structure, such as a B-tree, or in a suitable type of list. In another embodiment, thread-local storage can be allocated. The thread-local storage can maintain a pointer to the thread's tracking structure. The thread can use the pointer to access the thread tracking structure in real time.

At step 206, a supervisor thread and one or more management semaphores or mutex objects can be specified as an effect of the instrumentation process and made part of the instrumented computer program process 118. The supervisor thread can begin running when it is created. At step 208 a user interface showing the threads 112 of the CPUT and their lock status can be presented. Information about the CPUT can be output to the user interface for presentation to a user, for example in lists and/or thread and lock state data fields that are created or in any other suitable user interface fields.

At step 210, user inputs can be received from the user interface to enable threads, disable threads, serialize threads, assign thread priorities, assign management locks, and so on. Thread priority levels also can be assigned by a user in any suitable manner, for instance as previously described.

At step 212, thread creation and termination can be detected and tracked. In illustration, an identifier for relevant threads can be output to the user interface for presentation to a user, for example using a table or list showing an entry for each thread. The status of these threads also can be tracked and output to the user interface for presentation in a suitable manner, for example using identifiers, status indicators and/or flags. In one embodiment, only information for threads that currently exist is presented in the user interface, though this need not be the case. In such an embodiment, when a thread is terminated, its identifier and status indicators can be removed from the lists and tables presented via the user interface and/or from the list or tree of thread tracking structures that store this tracking information for use by the analysis and management procedures described herein.

Further, the CPUT's locks and attempts to engage the locks can be detected and tracked. For example, identifiers and/or handles for the synchronization objects, as well as any other suitable identifiers, can be tracked for use by the analysis and management procedures described herein. Corresponding status indicators and/or flags can be presented in a suitable synchronization object list via the user interface. The triggering of updates to the user interface can be based on recorded events associated with these synchronization objects. The use of locks by the Threads 112 also can be tracked and corresponding information can be communicated to the user interface. Thread serialization and parallelization, as well as attempts to change thread priority, also can be tracked. Moreover, any other activity of the CPUT can be tracked and/or invoked, and the invention is not limited to these examples.

At step 214, any such procedures implemented as part of the runtime analysis module 126, or as part of any other routines running on the system, can be invoked. Such procedures can be those corresponding to the detection of thread creation, termination, or other events. The procedures also can be those corresponding to lock creation, engagement, disengagement, and thread serialization, parallelization, and priority changes, as described below. The method 200 can return to step 210 and continue while the CPUT continues to run.

The flowcharts presented in subsequent figures present various runtime analysis procedures that may be invoked at step 214 in accordance with various embodiments of the present invention. As will be described, these procedures can track a variety of CPUT operations and present corresponding information to the user via the user interface, thereby facilitating runtime analysis on the CPUT. Moreover, user inputs can be received in real time to control execution of the CPUT, thus providing a high level of user interactivity for managing the execution and evaluating the various operations implemented by the CPUT, especially with respect to multithreaded operations.

Figure 3:
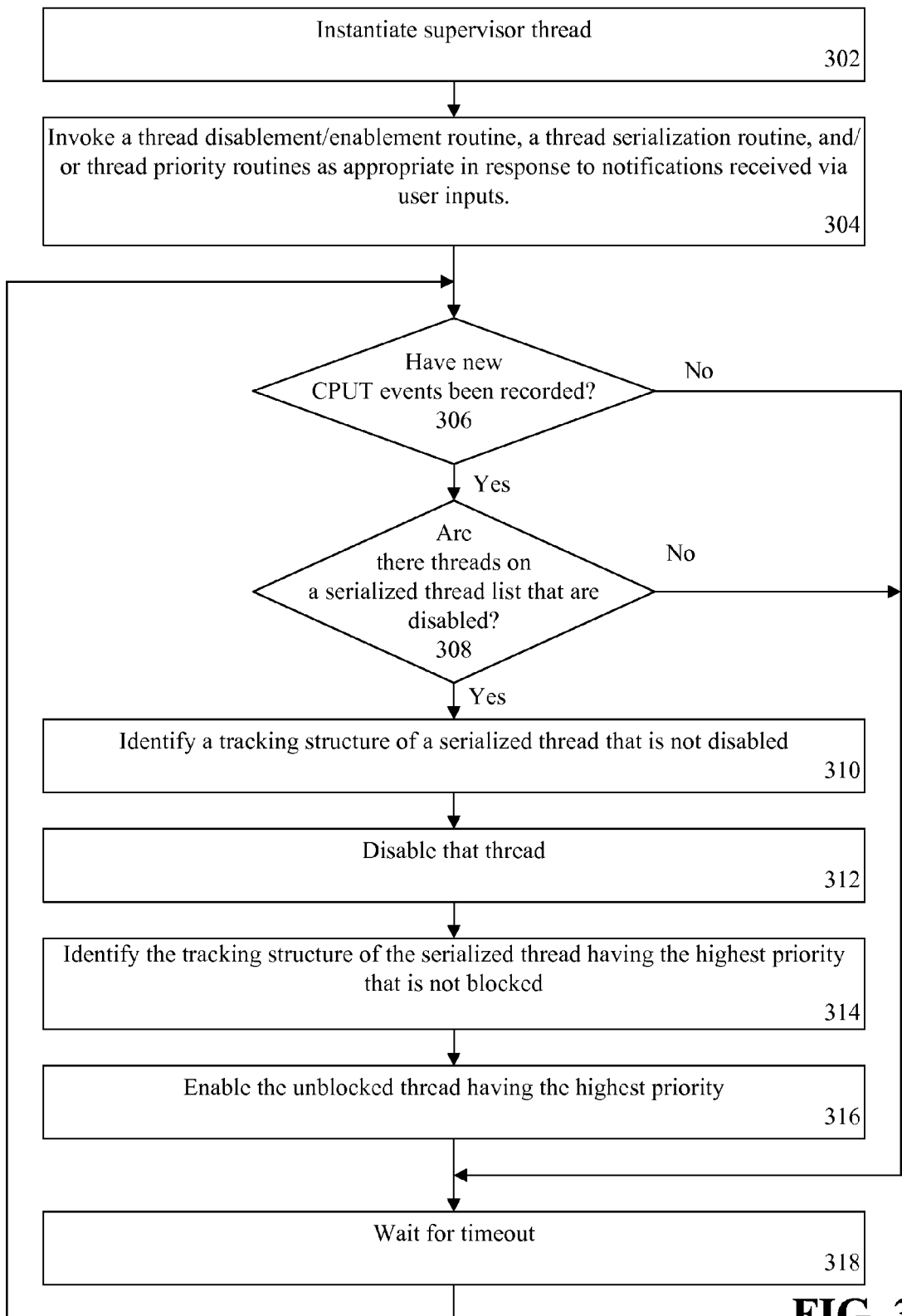
FIGS. 3-12 are flowcharts illustrating various methods of monitoring CPUT execution in accordance with other embodiments of the present invention.

FIG. 3 is a flowchart illustrating a method 300 of monitoring CPUT execution in accordance with another embodiment of the present invention. The method 300 can be implemented to control thread execution in accordance with the present arrangements described herein. The method 300 can be implemented while the CPUT continues to run.

At step 302, a supervisor thread can be instantiated. At step 304, various routines, such as those which will be described herein, can be invoked as appropriate in response to user inputs that are received. For instance, a routine can be invoked to serialize threads, disable threads, enable threads, set thread priority levels, freeze thread priority levels, and so on.

At decision box 306, a determination can be made as to whether any new CPUT events have been recorded. If so, at decision box 308 a determination can be made as to whether there are threads on a serialized thread list that are disabled. The serialized thread list can be a list of threads that are identified by user inputs received via the user interface as being threads that are to be serialized. Each of these threads can have an associated identifier indicating whether the thread is enabled or disabled. The identifiers can be set to be enabled or disabled based on the thread disablement and enablement techniques disclosed herein, by which means at least one thread may be enabled, while any or all of the remaining threads may be disabled.

If there are threads that are disabled, at step 310, a tracking structure of an enabled thread can be identified. At step 312, a thread disablement routine can be implemented to disable the thread that was enabled. At step 314, a tracking structure of a serialized thread that is not blocked and which has the highest priority among the unblocked threads can be identified. Threads that are blocked pending I/O or for other reasons can be identified based on means known to those skilled in the art. At step 316, the unblocked thread having the highest priority can be enabled. At step 318, the routine can wait for a timeout of a timer to occur. The process then can return to decision box 306.

Figure 4:
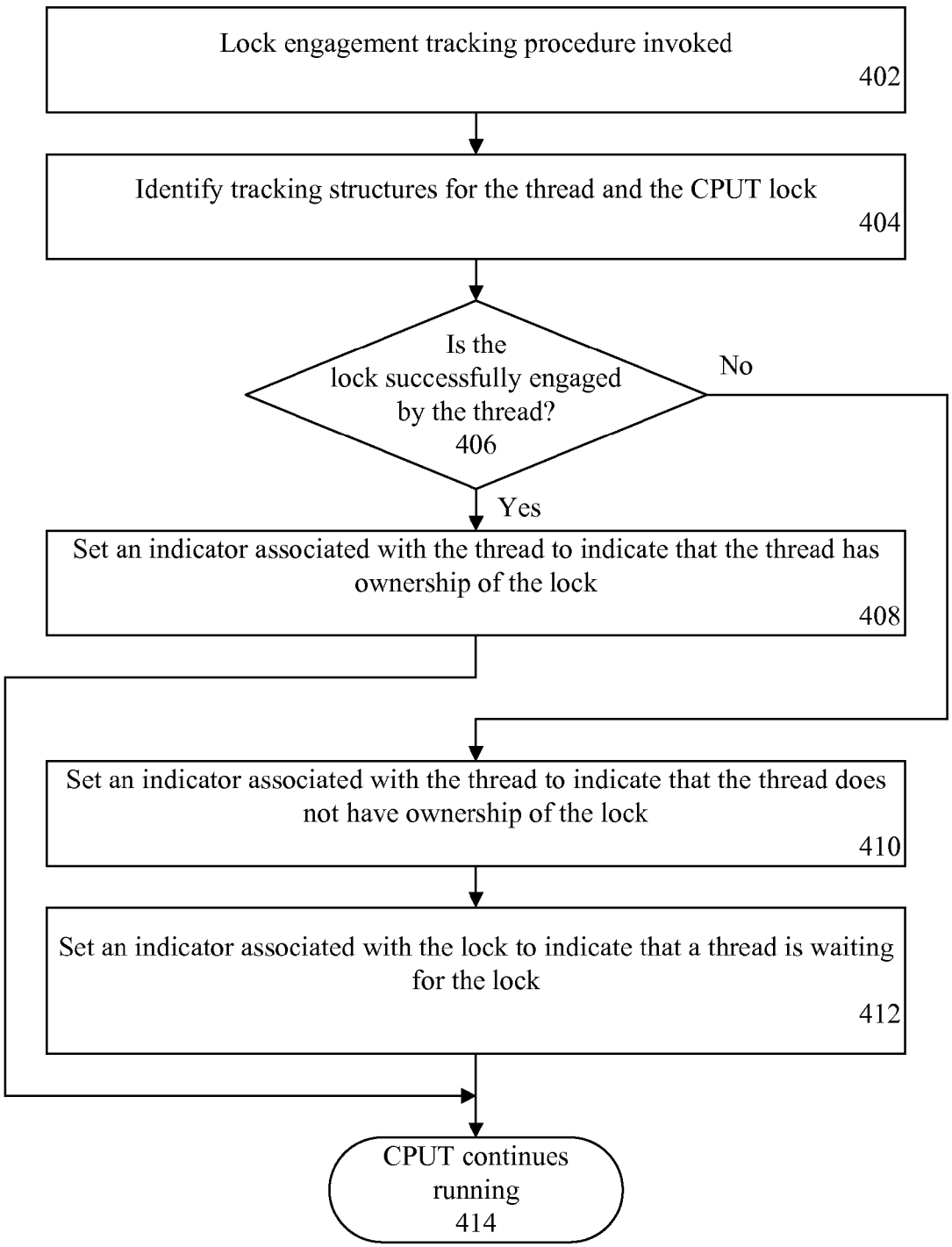

FIG. 4 is a flowchart illustrating a method 400 of monitoring CPUT execution in accordance with another embodiment of the present invention. The method 400 can be implemented to track engagement of the CPUT's locks by threads using those locks while the CPUT continues to run.

At step 402, a CPUT lock engagement tracking procedure can be invoked in response to an attempt by a thread to engage a synchronization object. This can be implemented by inserting code at the call site of a synchronization API function. For example, on a MICROSOFT® WINDOWS® operating system, code can be inserted at or near the call site to an EnterCriticalSection( ) API function call. Any and all calls by the CPUT to the relevant API functions can be intercepted via code inserted during the instrumentation phase. The insertion of code also can be implemented in any other manner suitable for an operating system or operating systems in which the CPUT is being developed, and the invention is not limited in this regard.

At step 404, a tracking structure for the thread can be identified. A tracking structure for the relevant CPUT lock also can be identified. Referring to decision box 406, if the CPUT lock is engaged by the thread, at step 408, an indicator, such as a flag, associated with the thread can be set to indicate that the thread has engaged the CPUT lock. If the CPUT lock is not engaged by the thread, at step 410, an indicator associated with the thread can be set to indicate that the thread does not have ownership of the lock. At step 412, because a thread that failed to acquire a CPUT lock is typically waiting for another thread to disengage the CPUT lock, an indicator associated with the thread can be set to indicate that the thread is waiting for the CPUT lock. The indicators set at step 408 or steps 410 and 412 can be tracked in the thread tracking structure identified at step 402 and can be used for purposes as needed by the various runtime analysis and control procedures described herein. The indicators also can be presented to the user in a user-viewable form via the user interface. At step 414, the CPUT can continue running.

Figure 5:
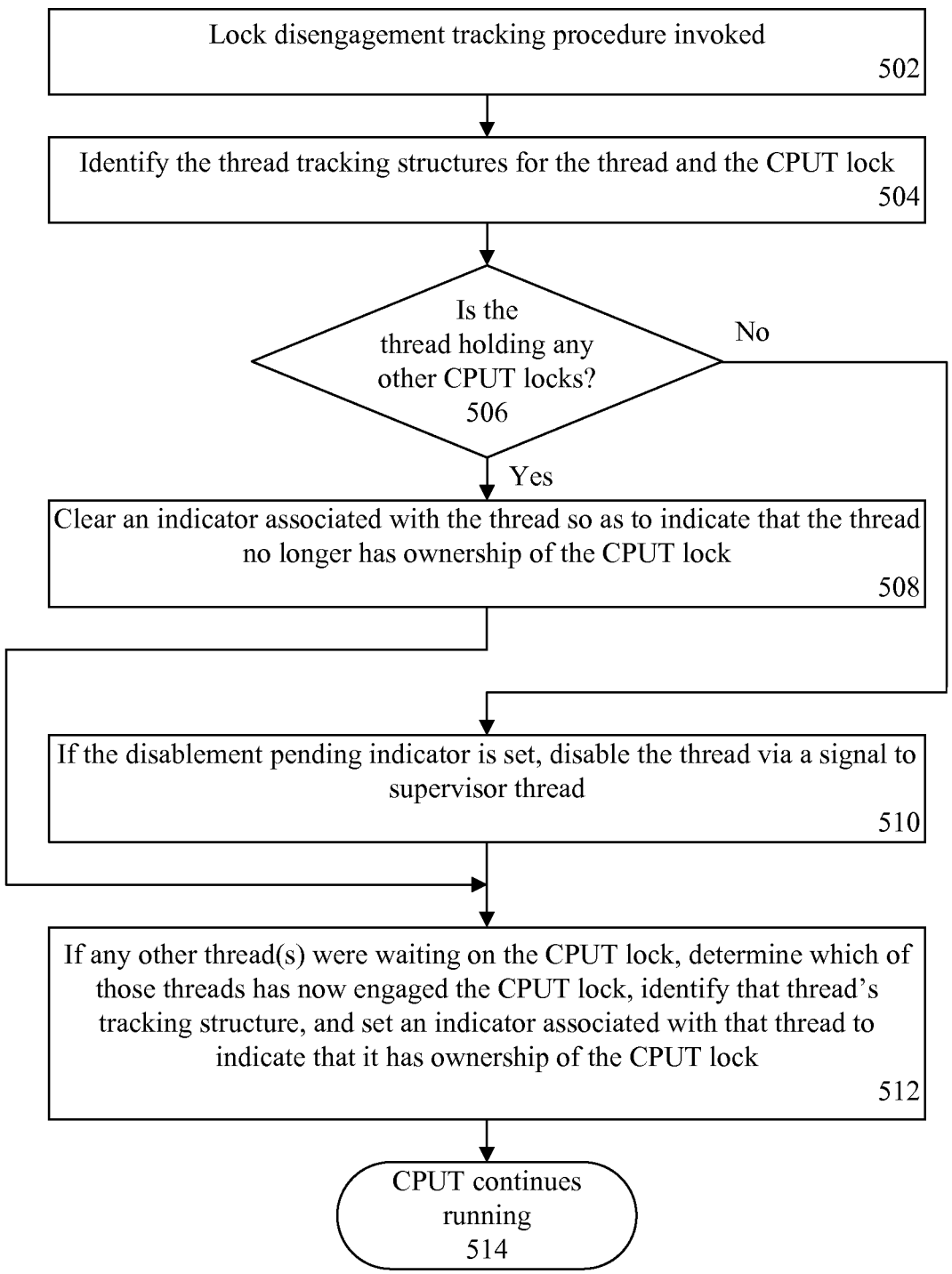

FIG. 5 is a flowchart illustrating a method 500 of monitoring CPUT execution in accordance with another embodiment of the present invention. The method 500 can be implemented to track disengagement of synchronization objects by the Threads 112 that have engaged them. Again, the tracking procedure can be invoked by step 214 of FIG. 2 and can be implemented while the CPUT continues to run. Alternately, the tracking procedure can be invoked by means of inserted code at the relevant synchronization API function's entry point or call site.

At step 502, the tracking procedure can be invoked in response to an attempt by a thread to disengage a synchronization object. This can be implemented by inserting code at the call site of a synchronization API function. For example, on a MICROSOFT® WINDOWS® operating system, code can be inserted at or near the call site to a LeaveCriticalSection( ) API function call. Any and all calls by the CPUT to the relevant API functions can be intercepted via code inserted during the instrumentation phase. Of course, the tracking procedure can be invoked in any other manner suitable for an operating system or operating systems in which the CPUT is being developed.

At step 504, a tracking structure for the thread can be identified. A tracking structure for the CPUT lock also can be identified. At step 506, a determination can be made as to whether the thread is holding any CPUT locks 114 other than the CPUT lock identified at step 504. If the thread is holding other CPUT locks 114, then at step 508 an indicator, such as a flag, that is associated with the thread, can be cleared in the thread tracking structure for use by other procedures described herein. Clearing of the indicator can be used to indicate that the CPUT lock is no longer engaged by the thread. If the thread is not holding other CPUT locks, and if a thread disablement pending indicator (which will be described at step 1006 of FIG. 10) is set, then at step 510, the thread can be disabled.

In any case, at step 512, the information from the various tracking lists described herein can be used to determine whether any other threads have been waiting to acquire the CPUT lock. If so, then a check can be performed via techniques known to those skilled in the art to determine which of those waiting threads has now acquired the CPUT lock. A tracking structure for that thread can be identified, and within that tracking structure an indicator can be set to indicate that thread has ownership of the CPUT lock. The indicators associated with steps 508 and 510 are tracked in the thread tracking structure identified at step 504. Those indicators may be used for purposes as needed by the various runtime analysis and control procedures described herein. The indicator associated with step 512 can be tracked in a similar thread tracking structure that is associated with a different thread and also can be used for runtime analysis and control purposes. All of these indicators also can be presented to the user in a user-viewable form. At step 514, the CPUT can continue running. For example, the CPUT can continue to run its own code and/or the routine can return to step 210 of FIG. 2.

Figure 6:
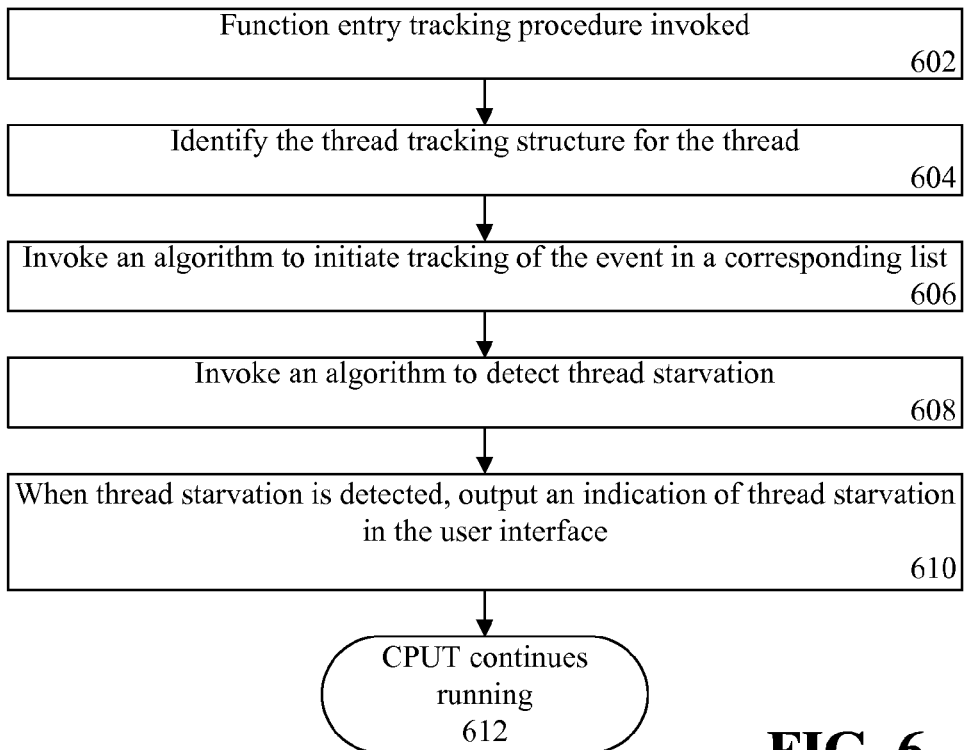

FIG. 6 is a flowchart illustrating a method 600 of monitoring CPUT execution in accordance with another embodiment of the present invention. The method 600 can be implemented to detect and track function entry by a thread.

At step 602, a function entry tracking procedure can be invoked. At step 604, a tracking structure for the thread can be identified. At step 606, an algorithm can be invoked to initiate tracking of the function entry event in an event list. Events that have become stale (e.g., not used within a particular period) can be deleted from the list. At step 608, an algorithm can be invoked to detect thread starvation (e.g., detect when the thread has been prevented from executing for a predefined period). At step 610, when thread starvation is detected, an indicator can be output to the user interface to indicate to the user whether the thread has been starved. At step 612 the CPUT can continue running.

Figure 7:
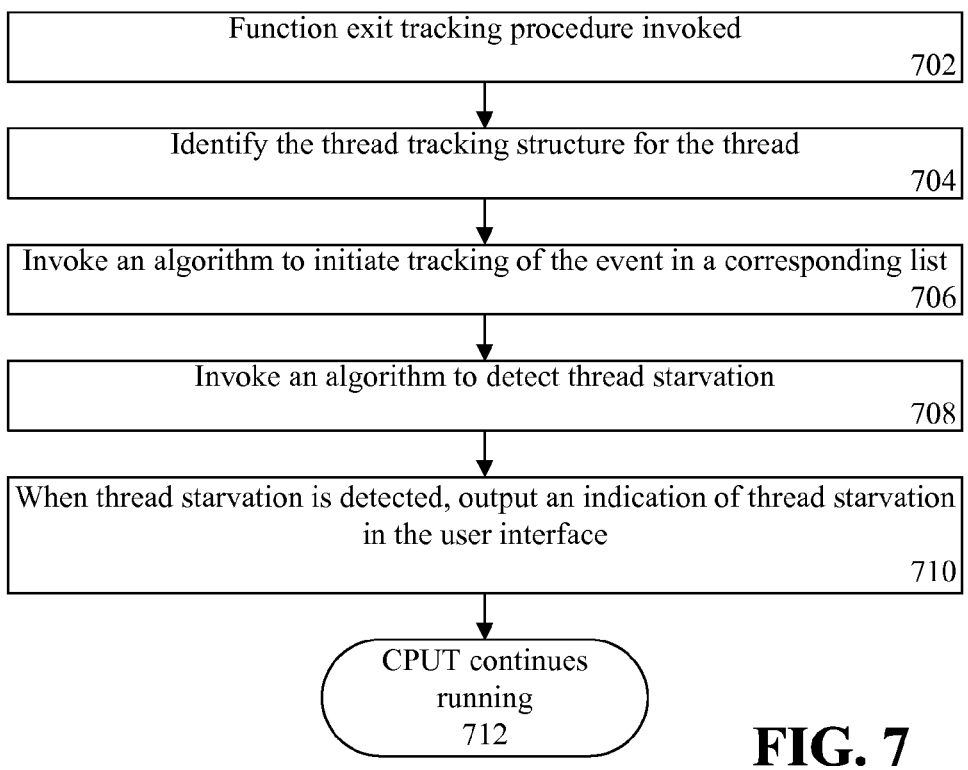

FIG. 7 is a flowchart illustrating a method 700 of monitoring CPUT execution in accordance with another embodiment of the present invention. The method 700 can be implemented to detect and track exits from functions.

At step 702, a function exit tracking procedure can be invoked. At step 704 a thread tracking structure for the thread can be identified. At step 706, an algorithm can be invoked to initiate tracking of the function exit event in an event list, which may be the same list associated with step 606 of FIG. 6 or which can be a different event list. Events that have become stale (e.g., not used within a particular period) can be deleted from the list. At step 708, an algorithm can be invoked to detect thread starvation. At step 710, when thread starvation is detected, an indicator can be output to the user interface to indicate to the user whether the thread has been starved. At step 712 the CPUT can continue running.

Figure 8:
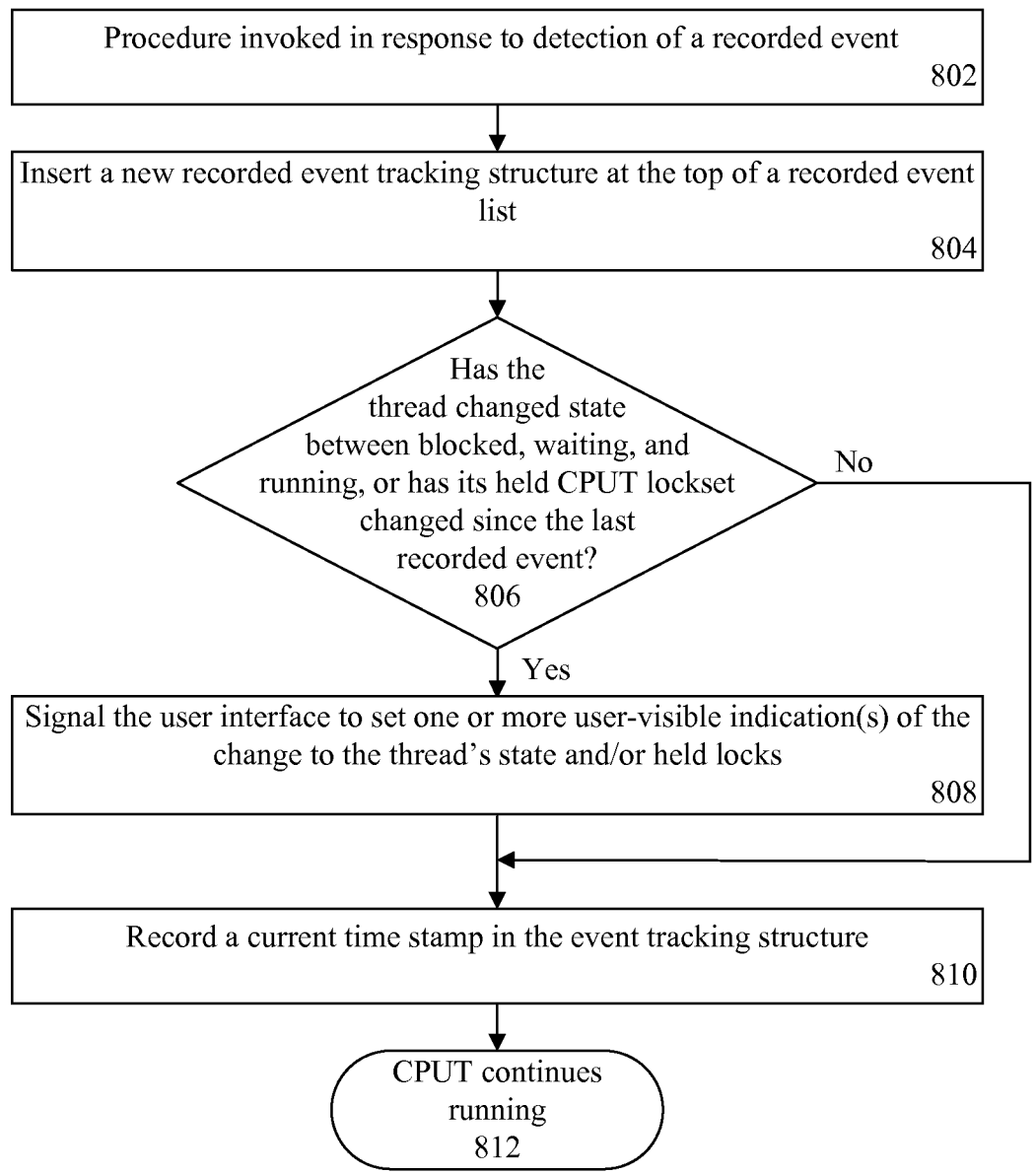

FIG. 8 is a flowchart illustrating a method 800 of monitoring CPUT execution in accordance with another embodiment of the present invention. The method 800 can be implemented to track recorded events, for example function entry and exit events, and invoked whenever such events are tracked as in methods 600 and 700.

At step 802, a routine can be invoked in response to a detection of a recorded event. At step 804, a new recorded event tracking structure can be inserted at the top of a recorded event list. In another embodiment, the new recorded event tracking structure can be inserted into the recorded event list in another suitable position that indicates the order in which the recorded event was detected with respect to other recorded events.

Referring to decision box 806, a determination can be made as to whether a specified field for a current thread has changed since the last recorded event. The current thread can be a thread that is presently running. The specified field can be a field comprising a flag that indicates that the current thread is waiting to acquire a synchronization object, a field comprising a flag that indicates that the current thread owns a CPUT lock, a field comprising a flag that indicates that the current thread owns a management lock, a field comprising a flag that indicates that the current thread is blocked for a serialized input/output operation, or any other field comprising a flag that may be of interest. In one embodiment, one or more fields can be used to indicate whether the current thread owns a CPUT lock and/or a management lock.

If a specified field has changed, at step 808 a signal can be sent to the user interface in order to show one or more user-visible indication(s) of the change to the thread's state or to the set of CPUT locks and/or management locks the thread holds. In addition, the identifier(s) generated can be output to a computer-usable medium. At step 810, a current time stamp can be recorded in the event tracking structure. At step 812 the CPUT can continue running.

Figure 9:
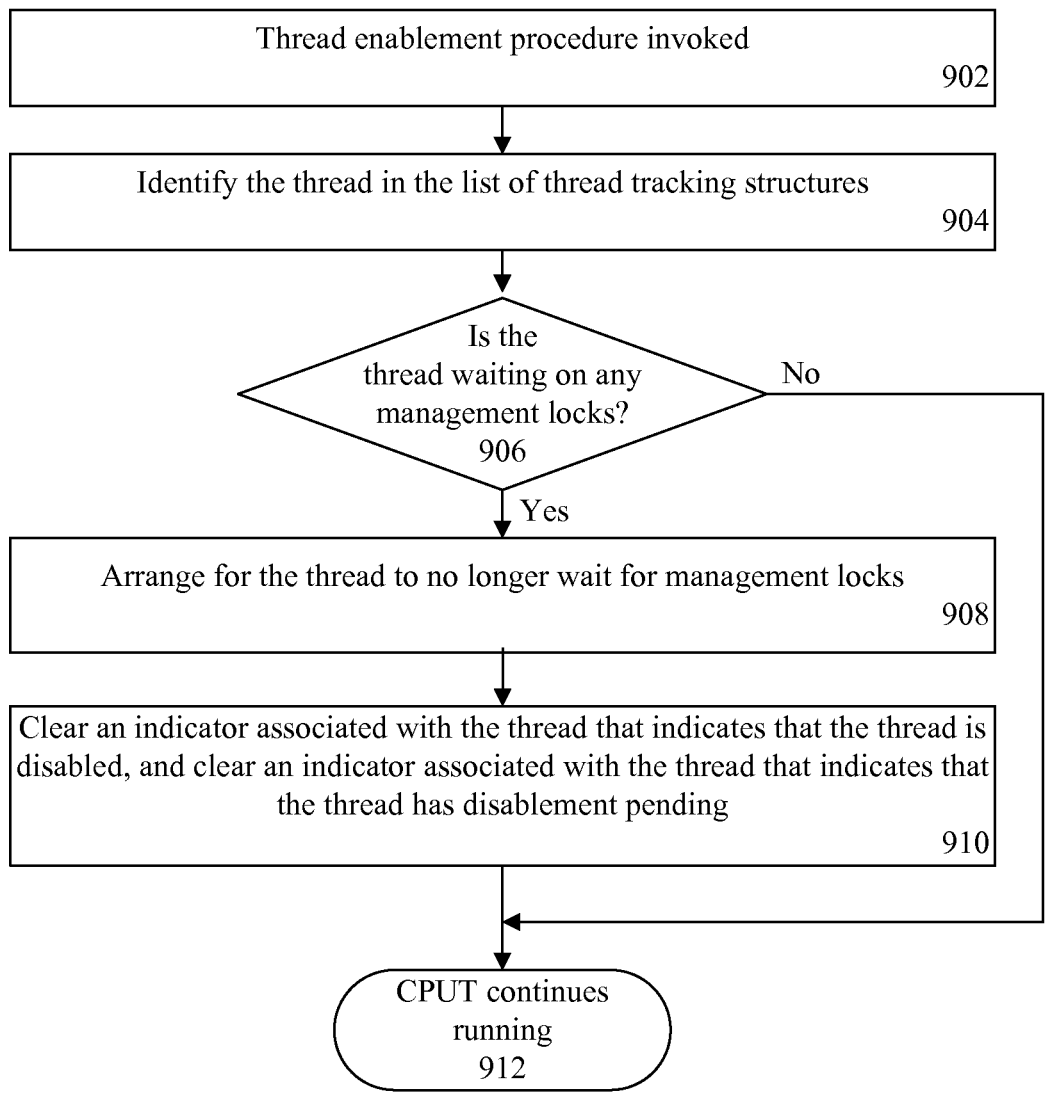

FIG. 9 is a flowchart illustrating a method 900 of controlling CPUT execution in accordance with another embodiment of the present invention. The method 900 can be implemented when enablement of a thread formerly disabled via a thread disablement procedure (which will be described at step 1010 of FIG. 10) is arranged by the user via the user interface or programmatically. The method 900 can be implemented while the CPUT continues to run.

At step 902, a thread enablement procedure can be invoked. At step 904, the thread being enabled can be identified in a list of thread tracking structures. Referring to decision box 906, a determination can be made as to whether the thread is waiting on a management lock. If so, at step 908 an arrangement can be made for the thread to no longer wait on the management lock.

For example, a management semaphore can be assigned to the thread and an associated counter can be decremented by one. If the maximum number of threads allowed to use the management semaphore has already been reached prior to the thread being granted access to the management semaphore, then access to the management semaphore by another thread can be rescinded. For instance, a thread that has a lower priority level than the subject thread can be identified and its access to the management semaphore can be rescinded. Management mutex objects can be managed in a similar manner, though a management mutex object typically is owned by only a single thread at any given time. In this regard, rather than a counter, ownership of a management mutex object can be indicated by a thread handle or other suitable identifier stored in the management mutex object.

At step 910, a disabled indicator and a disablement pending indicator can be cleared in the thread's tracking structure. At step 912, the CPUT can continue running.

Figure 10:
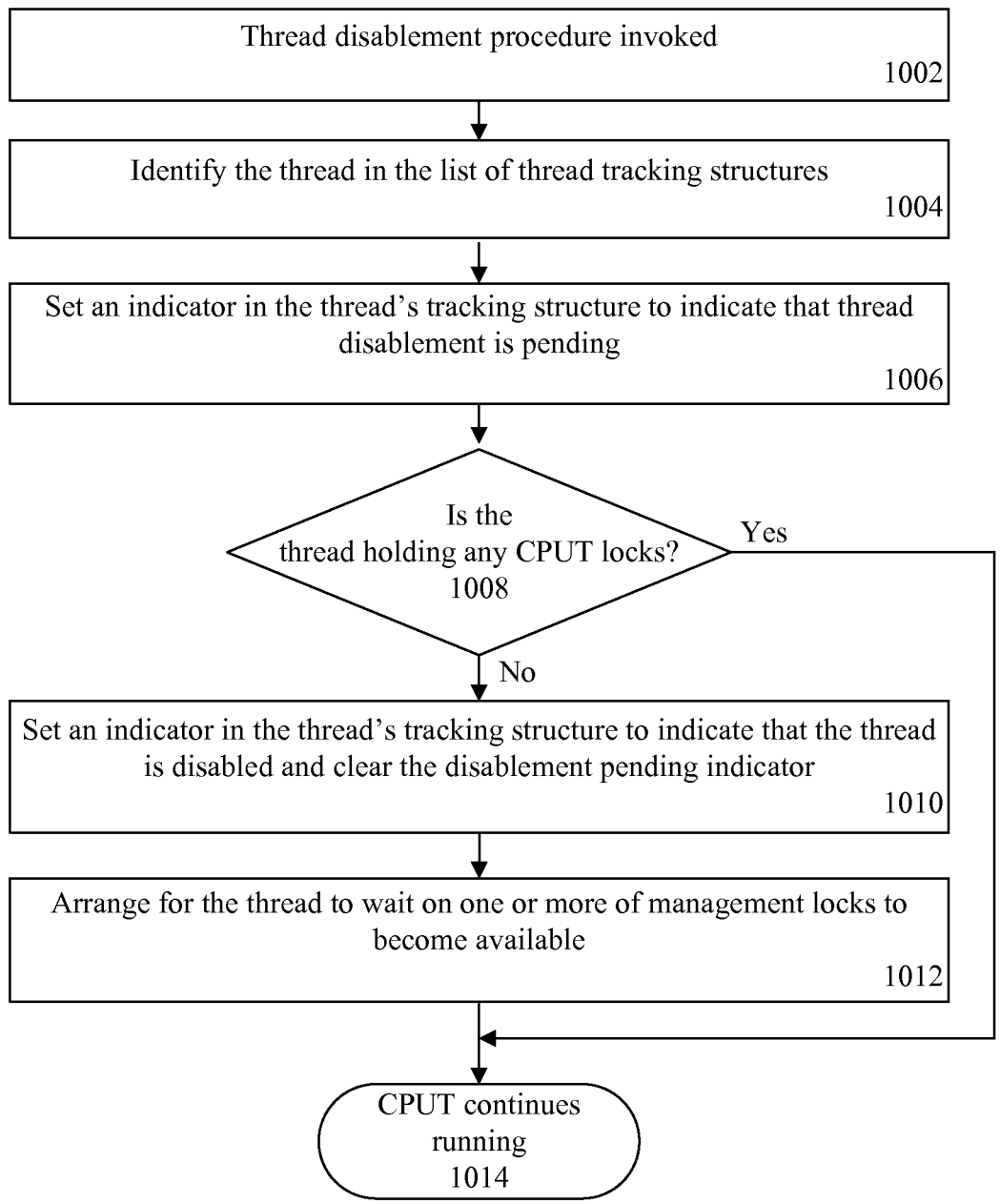

FIG. 10 is a flowchart illustrating a method 1000 of controlling CPUT execution in accordance with another embodiment of the present invention. The method 1000 can be implemented when disablement (or pausing) of a thread is arranged by the user via the user interface or programmatically. The method 1000 can be implemented while the CPUT continues to run.

At step 1002, a thread disablement procedure can be invoked. At step 1004, the thread to be disabled can be identified in the list of thread tracking structures. At step 1006, an indicator can be set in the thread's tracking structure to indicate that thread disablement (or pausing) is pending. For example, a flag can be set.

Referring to decision box 1008, a determination can be made as to whether the thread is holding a CPUT lock. If not, at step 1010 an indicator in the thread's tracking structure can be cleared to indicate that the thread is disabled (or paused) and the disablement pending indicator (e.g. a disablement flag) can be cleared.

At step 1012, an arrangement can be made for the thread to wait for a management lock to become available. For instance, an identifier corresponding to the thread can be entered into a queue of one or more threads that are waiting on the management lock. In one arrangement, the threads can be organized in the queue based on thread priority. Accordingly, a thread having the highest priority can be granted access to the management lock when the management lock becomes available. In some instances, multiple threads may have the same level of priority. In this case, the threads can be scheduled based on the order in which the threads entered the queue. At step 1014, the CPUT can continue running.

Figure 11:
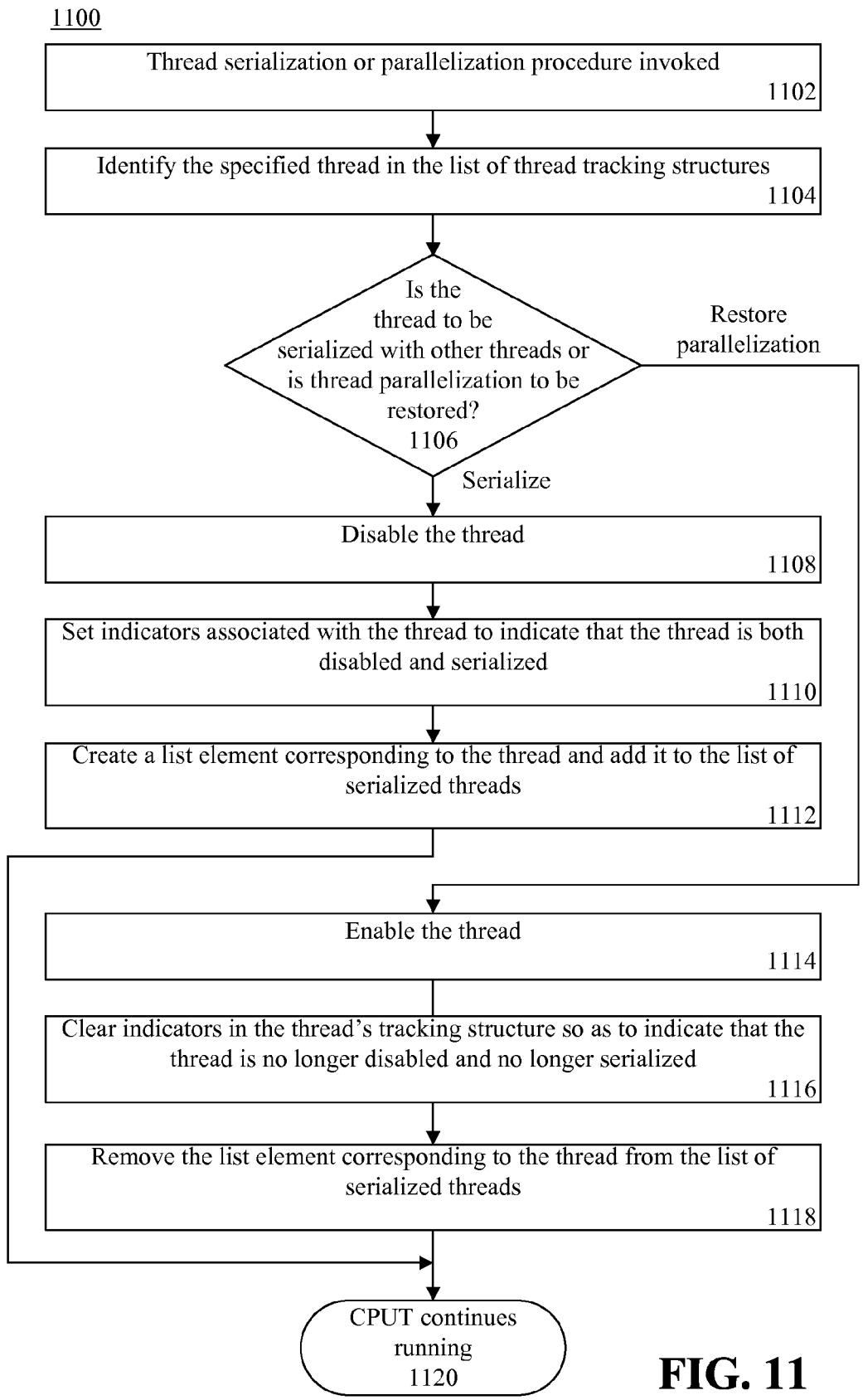

FIG. 11 is a flowchart illustrating a method 1100 of controlling CPUT execution in accordance with another embodiment of the present invention. The method 1100 can be implemented to serialize threads or restore thread parallelization. Notably, the threads that are selected to be serialized need not be those threads that are limited to serialized execution when the computer program is executed in a normal manner, for instance without use of a management lock or a runtime analysis module. In other words, the threads that are selected to be serialized can be those that are normally run in parallel with other threads. The method 1100 can be implemented while the CPUT continues to run.

At step 1102, the thread serialization or parallelization routine can be invoked. At step 1104, the thread can be identified in the list of thread tracking structures. Referring to decision box 1106, a determination can be made as to whether the thread is to be serialized with other threads or thread parallelization is to be restored. If thread serialization is to be arranged, at step 1108 the thread can be disabled via the thread disablement procedure described herein. At step 1110, an indicator can be provided in the thread's tracking structure to indicate that the thread is serialized. For example, a serialized flag can be set. At step 1112, an identifier corresponding to the thread can be generated for the list or queue of disabled threads to be serialized.

In one embodiment, multitasking of the serialized threads can be implemented by enabling a single thread at any given time. Other threads, such as those in a list or queue of disabled threads to be serialized, can remain disabled until it is time to enable a next thread. At that time the presently enabled thread can be disabled, and the next thread in the queue can be enabled. Each serialized thread that is not waiting for a lock held by another serialized thread may be enabled for a specified time or until it blocks for an input/output opportunity, waits for a lock, or releases a lock for which a serialized thread of higher priority is waiting. This process can continue until every serialized thread has had a chance to run while each of the other serialized threads is disabled. Multitasking can be implemented by repeating this process one or more times, each time executing each of the serialized threads when its turn arises.

Referring again to the decision box 1106, if thread parallelization is to be restored, at step 1114 the thread can be enabled via the thread enablement procedure described herein. At step 1116 an indicator in the thread's tracking structure that indicates the thread is serialized can be removed (e.g., the serialized flag can be cleared). At step 1118, the identifier corresponding to the thread can be removed from the list of serialized threads. At step 1120, the CPUT can continue running.

Figure 12:
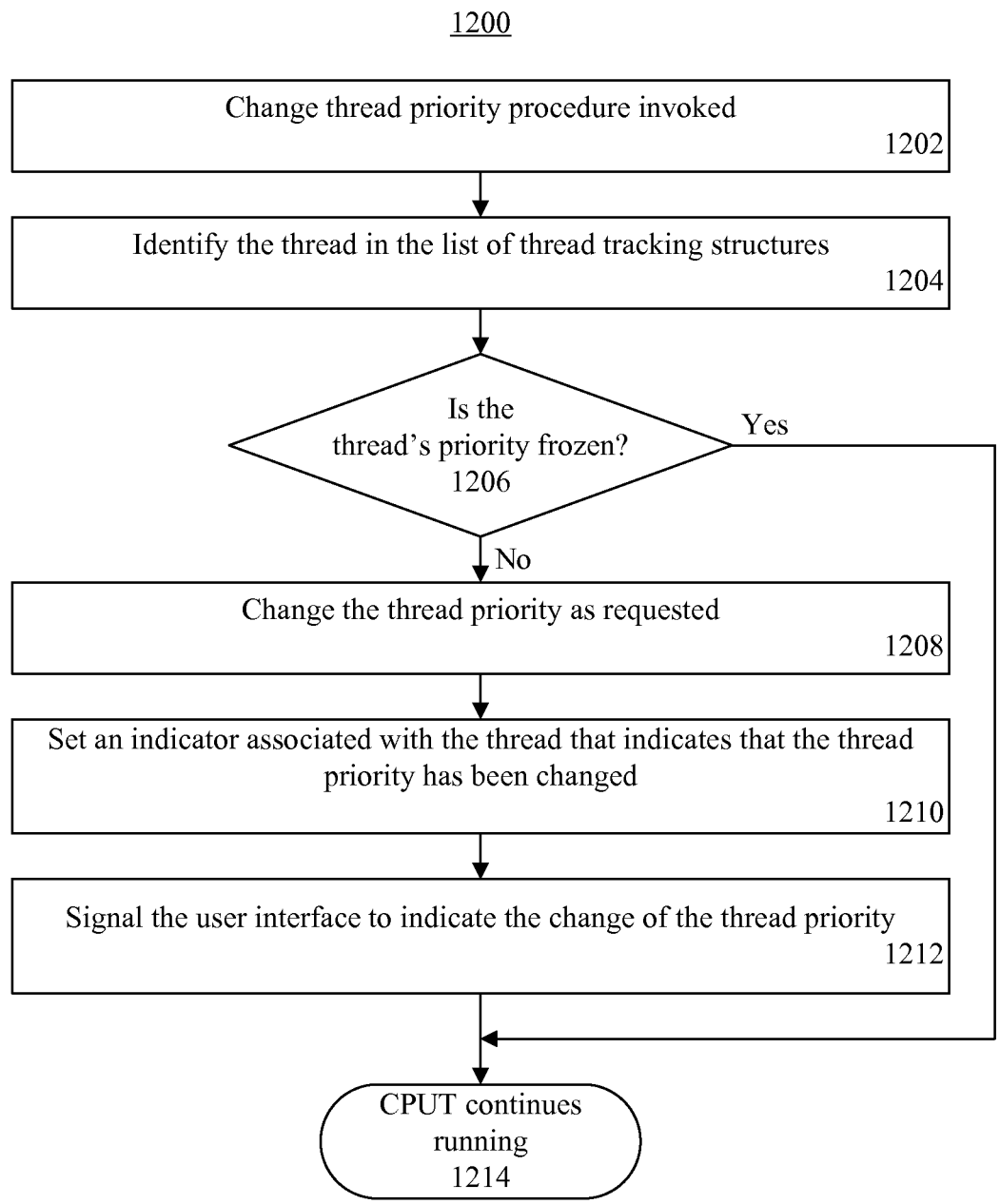

FIG. 12 is a flowchart illustrating a method 1200 of controlling CPUT execution in accordance with another embodiment of the present invention. The method 1200 can be implemented when a change in the priority of a thread is requested by the user via the user interface or programmatically. The method 1200 can be implemented while the CPUT continues to run.

At step 1202, the change thread priority procedure can be invoked. At step 1204, the thread for which the priority change is requested can be identified in the list of thread tracking structures. Referring to decision box 1206, a determination can be made as to whether the thread's priority is not frozen, as determined by the user via the user interface or programmatically. If the thread's priority is not frozen, at step 1208 the priority of the thread can be changed as requested. At step 1210, an indicator can be generated to indicate that the thread's priority has been changed. Referring again to step 1206, if the thread's priority is frozen, at step 1210 an indicator can be provided to the user interface to indicate to the user that the thread's priority is frozen and has not been changed. At step 1212, the user interface can be signaled to indicate the change of the thread priority. At step 1214, the CPUT can continue running.

At this point it should be noted that any identifiers, indicators and flags, as well as any other information, generated by the routines described in FIGS. 3-12 can be communicated to the user interface for presentation to the user. In addition, any of these also can be provided to a computer-usable medium.

As used herein, "output" or "outputting" can include, but is not limited to, storing data in memory, e.g., writing to a file, writing to a user display or other output device, e.g., playing audible notifications, sending or transmitting to another system, exporting, or the like.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of performing runtime analysis on and runtime control of a multithreaded computer program, the method comprising:
   identifying threads of a computer program to be analyzed;
   with a supervisor thread, controlling, using a processor, an execution of the identified threads;
   monitoring the execution of the identified threads to determine a status of the identified threads; and
   presenting in a user interface that is presented on a display at least one indicator corresponding to the determined status of the identified threads, wherein
   monitoring the execution of the identified threads comprises:
      instrumenting the computer program to track events for each of the identified threads of the computer program; and
      performing runtime analysis on the tracked events.

2. The method of claim 1, wherein:
   controlling execution of the identified threads comprises assigning a management lock to the identified threads to control when the identified threads are executed; and
   controlling execution of the identified threads comprises executing the identified threads in accordance with the management lock.

3. The method of claim 2, wherein presenting in the user interface that is presented on the display at least one indicator corresponding to the determined status of the identified threads comprises:
   presenting at least one thread status indicator that indicates which of the identified threads is waiting to receive ownership of the management lock.

4. The method of claim 1, wherein controlling execution of the identified threads comprises:
   serializing execution of a plurality of threads that are not limited to serialized execution when the computer program is executed without use of a management lock or a runtime analysis module.

5. The method of claim 1, wherein controlling execution of the identified threads comprises:
   allocating a management lock exclusively for ownership by one of the threads at a time; and
   revoking ownership of the management lock exclusively when there is no processor activity detected for the thread to which the management lock is allocated.

6. The method of claim 5, further comprising:
   receiving a user request to disable execution of at least one thread selected from the identified threads;
   queuing the user request until the selected thread no longer holds any management locks; and
   when the selected thread no longer holds any locks, assigning ownership of a management lock to a second thread;
   wherein the assignment of the management lock to the second thread disables execution of the selected thread until the selected thread is assigned ownership of the management lock.

7. The method of claim 1, further comprising:
   receiving a user input that indicates, for each of a plurality of the identified threads, a respective thread priority to be assigned; and
   assigning each of the respective thread priorities to a corresponding one of the identified threads;
   wherein controlling execution of the identified threads comprises:
   executing the identified threads in an order that is determined from the assigned thread priorities.

8. A method of performing runtime analysis on and runtime control of a multithreaded computer program, the method comprising:
   identifying threads of a computer program to be analyzed;
   with a supervisor thread, controlling, using a processor, an execution of the identified threads;
   monitoring the execution of the identified threads to determine a status of the identified threads; and
   presenting in a user interface that is presented on a display at least one indicator corresponding to the determined status of the identified threads, wherein
   monitoring the execution of the identified threads comprises:
      instrumenting the computer program to track use of computer program under test (CPUT) locks by the computer program; and
      performing runtime analysis on the tracked use of the CPUT locks.

9. A method of performing runtime analysis on and runtime control of a multithreaded computer program, the method comprising:
- identifying threads of a computer program to be analyzed;
- with a supervisor thread, controlling, using a processor, an execution of the identified threads;
- monitoring the execution of the identified threads to determine a status of the identified threads; and
- presenting in a user interface that is presented on a display at least one indicator corresponding to the determined status of the identified threads, wherein
- controlling execution of the identified threads comprises:
  - allocating a management lock for shared ownership by a plurality of the threads; and
  - revoking ownership of the management lock from a first of the plurality of the threads when there is no processor activity detected for the first thread.

* * * * *